(No Model.)

F. SHAILER.
EYEGLASS OR SPECTACLE CASE.

No. 361,724. Patented Apr. 26, 1887.

Witnesses
G. S. Elliott.
L. L. Miller.

Inventor
Fisk Shailer,
By his Attorney
Chas. H. Fowler

United States Patent Office.

FISK SHAILER, OF CHESTER, CONNECTICUT.

EYEGLASS OR SPECTACLE CASE.

SPECIFICATION forming part of Letters Patent No. 361,724, dated April 26, 1887.

Application filed March 21, 1887. Serial No. 231,705. (No model.)

*To all whom it may concern:*

Be it known that I, FISK SHAILER, a citizen of the United States, residing at Chester, in the county of Middlesex and State of Connecticut, have invented certain new and useful Improvements in Eyeglass or Spectacle Cases; and I do hereby declare that the following is a full, clear, and exact description of the same, reference being had to the annexed drawings, making a part of this specification, and to the letters and figures of reference marked thereon.

Figure 1:
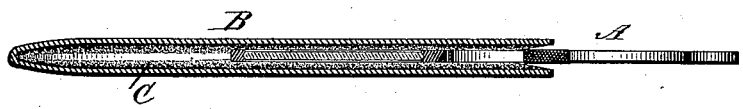
Figure 2:
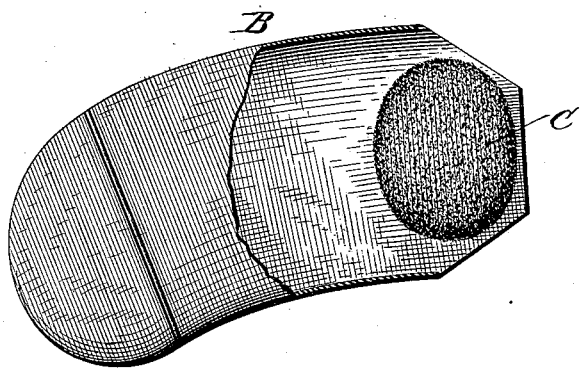

Figure 1 of the drawings is a sectional view of my improved eyeglass-case, showing one of the glasses in position when being cleaned; and Fig. 2, a perspective view of the case partly broken away to show one of the wipers.

The object of the present invention is to provide a case for eyeglasses or spectacles with means for cleaning the lenses thereof before removing them from their case; and it consists in providing the latter with a wiper or wipers, which are pressed in contact with the lenses to clean them previous to using, as will be hereinafter described.

In the accompanying drawings, A represents a pair of eyeglasses, and B the case therefor, which may be of any of the usual forms, and is open at one end for the insertion of the glasses. Upon the inner side or sides of the case B is suitably fastened or secured a wiper or wipers, C, composed of felt or any other suitable soft material for the special purpose of furnishing means which are always at hand for wiping and cleaning the lenses of dust or dirt, this being done when drawing them from the case for use.

In order to render the wipers operative it is necessary that the case be composed of leather or other like flexible material, so that the sides of the case may be pressed together by the fingers to bring the wiper or wipers in frictional contact with the surfaces of the lens.

The wiper or wipers C may cover the entire inner side of the case or extend only part way down from the open end thereof, as found preferable, and the wipers may be applied to cases for spectacles as well as those of eyeglasses, as I do not wish to be understood as confining myself to any special form of case; but it is essential that they may be made of a flexible material, such as hereinbefore described, in contradistinction to the sheet-metal cases as heretofore used, and the wipers may be attached to the case in any well-known manner. The wipers perform a further function of retaining the glasses securely in the case by coming in frictional contact therewith, and when required for use the case is taken in one hand and the sides thereof pressed inwardly by the thumb and forefinger, thus bringing the wipers against the lens of the glasses with the required pressure, so that when the glasses are withdrawn the lenses will be cleaned of any dust or dirt thereon.

Having now fully described my invention, what I claim as new, and desire to secure by Letters Patent, is—

A spectacle or eyeglass case constructed of leather or other flexible material and provided upon its inner side or sides with a wiper, substantially as and for the purpose set forth.

In testimony that I claim the above I have hereunto subscribed my name in the presence of two witnesses.

FISK SHAILER.

Witnesses:
 GIDEON PARKER,
 RICHD. L. SELDEN, Jr.